Figure 1:
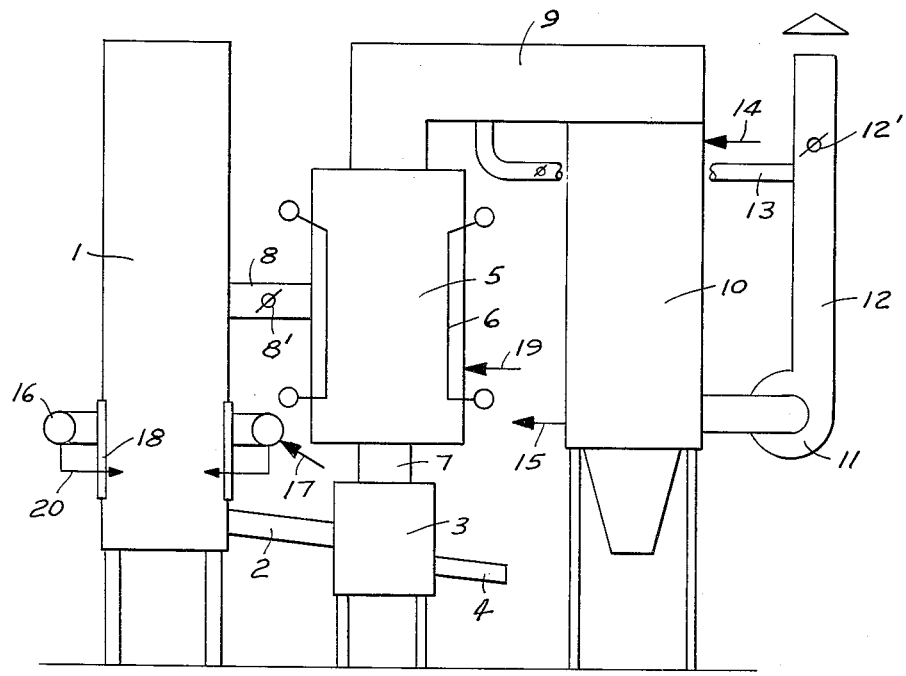

Aug. 22, 1961   H. L. SCHWECHHEIMER ET AL   2,997,288
CUPOLA FURNACE INSTALLATION

Filed Sept. 2, 1958                            2 Sheets-Sheet 1

INVENTORS
HANS L. SCHWECHHEIMER
ERNST LÖBBECKE
BY
ATTORNEYS

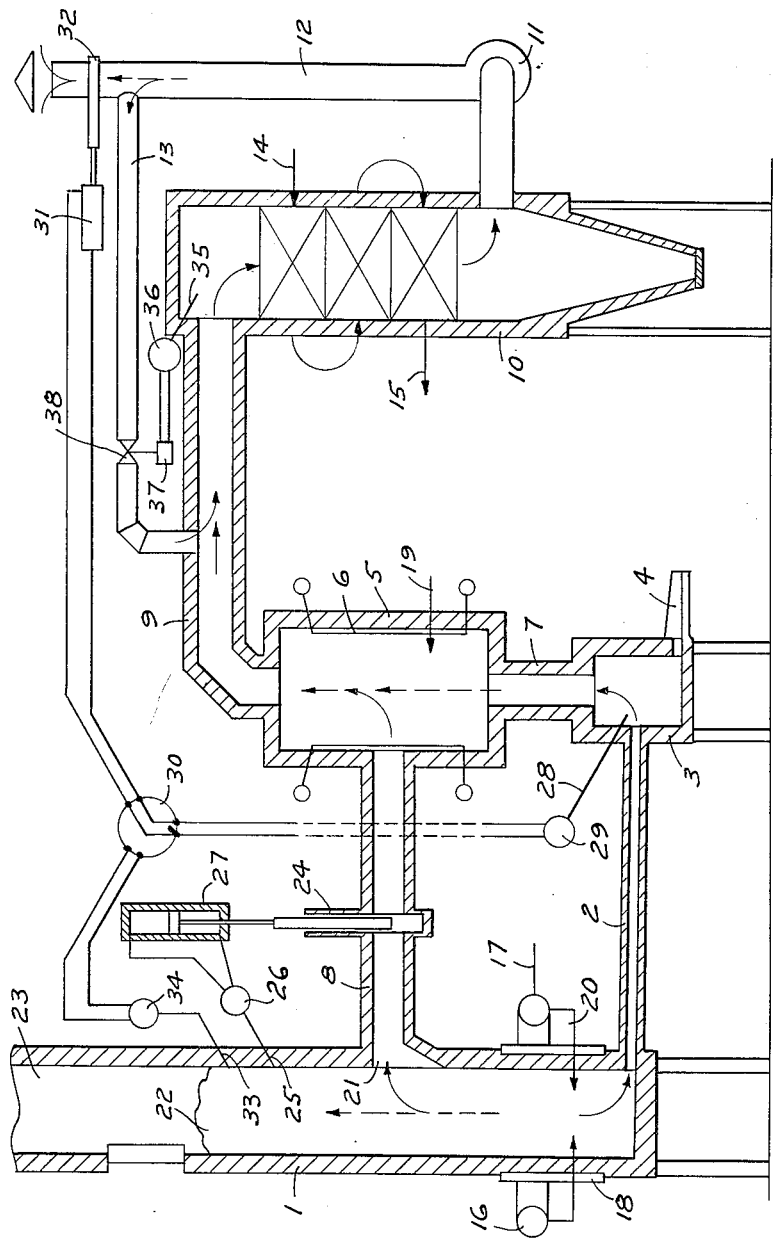

United States Patent Office 2,997,288
Patented Aug. 22, 1961

2,997,288
CUPOLA FURNACE INSTALLATION
Hans L. Schwechheimer, Haus Kerberg, and Ernst Löbbecke, Lebrachtstr. 25, both of Gummersbach, Germany
Filed Sept. 2, 1958, Ser. No. 758,261
Claims priority, application Germany Dec. 28, 1953
4 Claims. (Cl. 266—30)

The present invention relates to a cupola furnace installation operated with hot blast wind, and more particularly to a cupola furnace installation in which the hot gases are withdrawn from the furnace at least partly below the melting zone or the level of the tuyeres.

The present application is a continuation-in-part of our co-pending application Serial No. 468,473, filed November 12, 1954.

The principal object of the present invention is to provide a cupola furnace installation of the general type above referred to, the operation of which is highly economical and permits the use of a very large range of material in the furnace.

It is another object of the invention to provide a cupola furnace installation in which the heat contained in the furnace gases is utilized to the fullest extent.

Still another object of the invention is to provide a cupola furnace installation the furnace temperature of which can be regulated before and during operation in accordance with the optimal conditions for the specific charge to be melted.

It is still another object of the invention to provide a novel and improved cupola furnace installation which includes control means for regulating the operational conditions before and during operation so as to assure a substantially uniform analysis of the molten iron or other metal.

A further object of the invention is to provide a novel and improved cupola furnace installation the operational conditions of which can be regulated conveniently for maximum fuel economy if such be desired.

A still further object of the invention is to provide a novel and improved cupola furnace installation which is particularly suitable for the working of raw materials, such as coke, which include substantial quantities of dust in that the installation is equipped with means for binding the metal dust and recovering the metal contained in the dust, thereby reducing dust losses to a minimum and obviating the need for special dust separators.

It is a still further object of the invention to provide a novel and improved cupola furnace installation in which the latent heat of the gases may be used to operate heat exchanges which in turn may serve to preheat the combustion air, to heat water or to generate steam.

Yet a still further object of the invention is to provide a novel and improved cupola furnace installation which includes temperature control means which permit a control of the temperature prevailing in the furnace, the ducts and other equipment of the installation such that a fouling of the heat exchanger walls by precipitation or deposition of chemical compounds contained in the gases is effectively avoided or at least impeded. Depositions on the heat exchanger walls and other walls tend to reduce materially the exchange of heat and also to clog the ducts and the tap hole.

Still another object of the invention is to provide a novel and improved cupola furnace installation from which molten iron can be discharged continually or intermittently, simultaneously with the hot gases and slag if desired.

A still further object of the invention is to provide a cupola furnace installation in which several furnaces according to the invention are combined in a battery having a common forehearth, a common radiation or afterburning chamber and also common heat-exchange means if desired. Such furnace battery has been found to be highly economical and hence advantageous.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 1 is a diagrammatic elevational view of a cupola furnace installation according to the invention.

Figure 3:
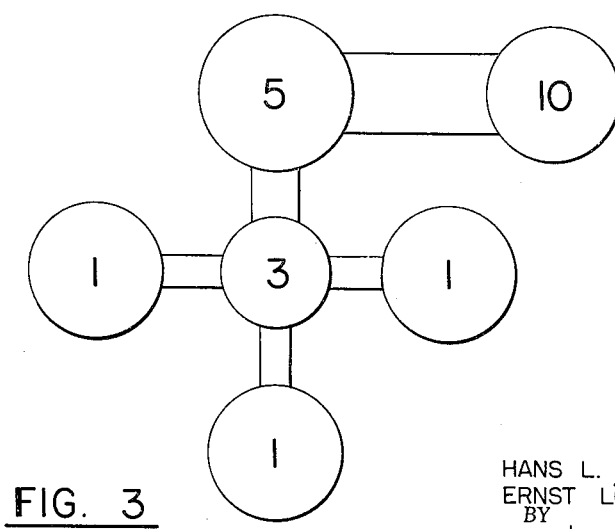

FIG. 2 is an elevational view, partly in section, of an installation similar to the installation according to FIG. 1, but showing more in detail the regulating and control means essential or useful for the operation of the installation, and FIG. 3 is a diagrammatic plan view of an installation in which several cupola furnaces are coupled to a common forehearth with radiation chamber and heat exchanger.

Referring first to FIG. 1 in detail, there is shown a cupola furnace 1 from which are discharged the molten iron and part of the hot gases through a common conduit or duct 2 below the melting zone and the level of tuyeres 20. The iron and the gases are fed through conduit 2 to a forehearth 3. The slag may be discharged from the furnace also, either through conduit 2 or through a separate tap hole which is not shown. A tap 4 serves to discharge the molten iron from the forehearth 3. A radiation chamber 5 is disposed above forehearth 3. Heat exchanger elements 6 are provided in this chamber which elements may be arranged as air heater elements and also as hot water or steam generating and steam superheating elements. The hot gases are fed from forehearth 3 through a conduit 7 into radiation chamber 5. Additional gas is discharged from the cupola furnace at any level above the level of the tuyeres and fed through a conduit 8 including an adjustable damper 8' into radiation chamber 5. The gases fed to the radiation chamber, which may also form an after-burning chamber, through conduits 7 and 8 are discharged from the chamber through a conduit 9 and fed to a heat exchanger 10. By means of this exchanger, the heat latent in the gases may be used to heat air or water or to generate steam. A suction blower 11 discharges the gases flowing through the installation into the atmosphere through a stack 12, including an adjustable damper 12'. There is further provided a conduit 13 through which gases from the stack may be refluxed into the conduit 9 for the purpose of regulating the temperature at which the gases enter heat exchanger 10. Cold wind is admitted into the heat exchanger through a conduit 14 and is discharged from the heat exchanger through a conduit 15. It is fed through a conduit 17 to the bustle pipe 16 of the cupola furnace. The temperature of the air preheated in heat exchanger 10 may be further elevated in elements 6 if a particular high blast wind temperature is required or desirable for the cupola furnace.

The cupola furnace itself may be equipped with cooling elements 18 preferably located in the melting zone. These elements may be advantageously used as steam producing elements for the purpose of keeping as low as possible the required volume of cooling water. Such an arrangement further allows to keep the temperature in the cooling units constant at predetermined values by controlling the pressure at which the elements 18 are operated.

If desired, the furnace installation may be equipped with a duct 19 leading into the radiation chamber 5 for supplying additional hot combustion air to the installation. The air supplied through duct 19 may be generated in an auxiliary burner installation.

Referring now to FIG. 2, in the installation according to this figure the cold wind is again fed through conduit 14 to recuperator or heat exchanger 10 from which it is discharged as hot blast wind through a conduit 15. The hot blast wind is fed through conduit 17 to wind bustle 16 and through the tuyeres 20 into the furnace. The furnace should be visualized as being charged with coke at the level of tuyeres 20. The coke is burned by the hot blast wind whereby a corresponding volume of furnace gases is generated which are discharged from the furnace through several separate flow paths, as will be more fully explained hereinafter. Part of the furnace gases is fed together with the molten iron and the liquid slag through duct 2 to the forehearth 3 from which iron may be discharged as required through tap 4. The furnace gases fed into the forehearth 3 flow through duct 7 into the combustion chamber 5 the walls of which may be protected from overheating by the heat exchangers 6 in the form of cooling pipes if necessary. The remainder of the gases rises from the tuyeres. A branch flow is discharged from the furnace through a vent 21 leading into duct 8, and the remaining gases flow past the throat portion 22 and are discharged through the furnace stack 23. The partial flow through duct 8 is also fed to combustion chamber 5. Duct 8 includes a regulator or damper 24 which serves to vary the free cross section of the duct. As is evident, any variation of the flow through duct 8 causes a corresponding but opposite variation of the volume of gas flowing out through throat 22.

When a furnace is normally charged and in operation, the zone between vent 21 and throat 22 is filled with the charge. The charge, such as iron ore, causes a cooling of the rising gases. When now damper 24 is gradually closed thereby causing an increase of the gas flow past vent 21 and toward the throat, the gas temperature in this zone rises, since the heat transfer from the gas to the charge increases less than the volume of the gas.

When it is desired to melt in the furnace iron which has a particularly low content of sulphur, it is necessary to maintain the gas temperature at the throat so high that a sublimation of the sulphur compounds, which are driven out in the hot zone of the furnace, is not possible. To control the temperature conditions in the furnace, a suitable temperature probe 25 extends into the furnace between vent 21 and the throat. This probe controls in a well known manner a relay 26 which in turn actuates a suitable operating mechanism for damper 24, such as a servo motor 27. As is evident, servo motor 27 will regulate the position of damper 24 and thus the temperature at the throat level.

The aforedescribed temperature control system can also be used if the furnace is charged with anthracite as fuel and it is desired to prevent a condensation of tar at the throat level.

The control system further may be used to prevent the ejection of dust at the throat. However, for this purpose, it is preferable to make probe 25 sensitive to the volume of gas. Arrangements of this kind are well known in the art.

The superheating of the molten iron is primarily controlled by the volume of gas which flows into the forehearth 3 through duct 2 jointly with the iron and the slag. To maintain the superheating of the iron at a substantially constant level, a temperature probe 28 extends into the forehearth. This probe detects the temperature within the forehearth and controls a relay 29 as a function of the forehearth temperature. Relay 29 is connected through a suitable changeover switch 30 to a servo motor 31 which in turn operates a damper 32 in the open discharge end of duct 12, also serving as a stack. Switch 30 is shown to be set to connect servo motor 31 to relay 29 but may also be set to connect the servo motor to a relay 34, more fully described hereinafter.

As is apparent, an increasing opening of damper 32 results in an increasing gas flow through duct 2, forehearth 3, duct 7, combustion chamber 5, duct 9, recuperator 10, suction blower 11 and duct 12. As a result the temperature of the iron and the slag will rise correspondingly. Consequently a suitable adjustment of relay 29 will result in maintaining a substantially constant iron temperature which in turn results in a uniform analysis of the iron. Under certain conditions it is primarily desirable to operate the furnace at a maximum fuel economy. Maximum fuel economy requires that the gas temperature at level 22 be kept as low as possible. To this end, a temperature probe 33 extends into the furnace at about level 22 and controls relay 34 which in turn controls through the appropriately switched switch 30 servo motor 31 and thus damper 32. Probe 33 and relay 34 are set so that flow of gas through duct 2 is maintained at a maximum.

Damper 24 can be simultaneously controlled by probe 25, relay 26 and servo motor 27, provided probe 25 is sensitive to the gas volume or the gas pressure. Such setting of the probe is well known in the art.

To avoid an undesirable influence of the aforedescribed regulating operations upon the heat of the blast wind, the temperature of the gas fed to the recuperator 10 is controlled by means of a temperature probe 35 which detects the temperature in the recuperator and controls through a relay 36 and a servo motor 37 a damper 38 in duct 15, so that the volume of already cooled gas which flows from the duct 12 through the duct 13 into the duct 9 corresponds to the prevailing and detected temperatures. Such control of the gas temperatures by refluxing already cooled gas into the hot gas is well known.

When it is desired to prevent any discharge of the gas at the throat 22, which is for instance advantageous when the charge contains large quantites of dust, relay 26 may be set for a zero volume of gas, for the pressure or temperature of ambient atmosphere. Probe 25 must then of course be set in accordance with the physical magnitude to be supervised. When the probe 25 is set to prevent any gas discharge at the throat 22, all the gases which rise within the furnace from the tuyeres 20 are withdrawn through the vent 21 and the duct 8 into the combustion chamber 5. The dust entering chamber 5 together with the gases is either liquefied or combusted in chamber 5 due to the high temperatures prevailing therein. The liquefied dust flows through duct 7 into the forehearth 3 in which it intermingles with the slag. The slag, due to its high temperature, has a reactivity which is so high that the major portion of the iron oxide content of the liquefied dust is reduced to iron. The high temperature in chamber 5 and in forehearth 3 is supervised and maintained by relay 29 and its associated probe 28. Relay 29 controls through switch 30 servo motor 31 which in turn controls damper 32, as already described. A very high temperature in the combustion chamber is obtained due to the fact that an adequate volume of furnace gas reaches the combustion chamber 5 through duct 2, forehearth 3 and duct 7. As is well known, furnace gas withdrawn below the level of tuyeres 20 is extremely hot and has a high CO content. Inasmuch as duct 19 supplies fresh combustion air to chamber 5, the resulting intensive combustion generates a very high temperature which is rapidly transmitted to the dust particles. Such particles have, due to their small size, a relatively large heatable surface and hence present very favorable conditions for the heat exchange. The coke dust is simply combusted, and the iron containing dust is assuredly liquefied due to its low melting temperature. The silicon containing dust and the lime containing dust coagulate with the already molten iron containing dust whereby the melting temperature of the silicon dust and the lime dust are reduced to such extent that they are liquefied without difficulty.

The slag contained in forehearth 3 is considerably hotter than the liquid iron since the common withdrawal of iron slag and furnace gas through duct 2 can be conveniently conducted so that the substances are layered due to the marked differences in the specific weights. The iron will flow along the bottom of duct 2, the liquid slag will flow above the iron, and the very hot furnace gas will flow above the slag. The gas will transfer heat to the slag due to its high temperature. As a result, the slag will always be hotter than the iron. The dust liquefied in chamber 5 is still hotter than the slag and will flow through the duct 7 into the layer of slag above the iron in forehearth 3. Due to the temperature gradient between liquefied dust, liquefied slag and liquid iron, an intense exchange of matter takes place. As is well known, an exchange of matter is strongly favored by a simultaneous exchange of heat. Consequently the metal content of the liquefied dust has a strong tendency to penetrate as quickly as possible first into the top layer of slag and then through the layer of slag into the sump of metal. This affords the advantage that a dust ejection at the throat 22 is prevented, that the metal content of the dust is absorbed practically completely by the matter in forehearh 3 and that finally the combustible parts of the dust are utilized in the recuperator 10 following the combustion chamber 5.

As a result, the installation of dust separating equipment for the working of dust containing charges is no longer needed, and the dust, instead of being collected in the dust separator and discarded, which may constitute a considerable loss, is fully utilized and yields additional liquid metal.

The aforedescribed binding of the dust in the combustion chamber 5 affords the additional advantage that the heating surfaces of the recuperator are protected against coating with dust. If the furnace gases would be merely withdrawn through vent 21, conducted through duct 8 into chamber 5 and burned in this chamber, the resulting temperatures would be too low to melt the iron containing dust. Due to the oxidation of $SiO_2$ dust, clouds would be formed from the gaseous SiO which is generated in the chute of furnace 1. The $SiO_2$ dust has a very high melting temperature and can be captured only when the iron containing dust is liquefied. Accordingly, in hot blast wind cupola furnace installations of conventional design, which operate merely with gases withdrawn above the level of the tuyeres, a very marked fouling of the recuperator can usually be observed. The heating surfaces of the recuperator are generally covered with a strongly adhering coating of $SiO_2$ to which lime and iron containing dust sinters itself. Due to such fouling of the heating surfaces, the heat exchange on the gas side of the recuperator heating surfaces drops rapidly. The temperature of the blast wind heated in the recuperator decreases accordingly. Such lower temperature of the blast wind has an adverse effect upon the analysis of the molten iron. When the blast wind is very hot, a pickup of silicon generally takes place, whereas if the blast wind is less hot, a loss of silicon can generally be observed. Furthermore, a lessened carburization of the iron occurs when the iron temperature is lowered. Such a reduced carburization causes an increase in the melting point of the iron. As a result, fouling of the heating surfaces of the recuperator frequently causes a freezing of the tap hole for the iron. Such freezing inevitably results in a substantial increase of rejects, since the molds tend to run no longer full, and the finished casts are difficult to machine.

While the invention has been described in detail with respect to certain now preferred examples and embodiments of the invention, it will be understood by those skilled in the art after understanding the invention that various changes and modifications may be made without departing from the spirit and scope of the invention, and it is intended, therefore, to cover all such changes and modifications in the appended claims.

What is claimed as new and desired to be secured by Letters Patent is:

1. A cupola furnace for melting metal comprising, in combination, an upright hearth in said furnace for receiving a charge, said hearth having at its upper end an open mouth for the discharge of gases and tuyeres in its side for supplying air to said hearth to support combustion of fuel therewithin, a closed, gas heated forehearth, a radiation chamber, heat exchange means for heating said combustion air, a first closed duct communicating with said furnace hearth below the level of the tuyeres and with said forehearth for withdrawing in a stratified flow, molten metal, slag and a portion of the furnace gases from said hearth to said forehearth, the gas flowing through the first duct being partly burned in the forehearth for supplying heat to the forehearth to superheat the metal therein, a second closed duct communicating with said furnace hearth above the level of said tuyeres and below the mouth of the furnace for feeding an additional portion of the furnace gases from said furnace hearth to said radiation chamber, the balance of the gases being discharged through said mouth, adjustable damper means in said second duct for varying the flow of gas through said second duct thereby correspondingly varying the proportion of gases discharged through said mouth, a third closed duct communicating with said forehearth delivering furnace gases from said forehearth to said radiation chamber to mix said gases with the gases supplied to said chamber from above the level of said tuyeres for afterburning of the gases, a fourth closed duct feeding gas from said radiation chamber to said heat exchange means, a fifth closed duct communicating with said heat exchange means for discharging the gas from said heat exchange means into the atmosphere, control means responsive to the gas flow in a zone of said furnace hearth above the level of said second duct and below the hearth mouth and controlling the adjustment of said damper in the second duct corresponding to the gas flow detected in said zone of the hearth thereby correspondingly varying the gas flow through the first duct, an adjustable damper in said fifth duct, and temperature responsive control means detecting the temperature in said forehearth and controlling the adjustment of the damper in said fifth duct.

2. A cupola furnace according to claim 1 and further comprising temperature responsive control means detecting the temperature in the furnace above the level of said second duct and below the furnace mouth and controlling the adjustment of the damper in said fifth duct.

3. A cupola furnace according to claim 2 and further comprising change-over means for selectively rendering operative, respectively, the control means detecting the forehearth temperature and the control means for controlling the damper in said fifth duct.

4. A cupola furnace according to claim 1 and further comprising a sixth closed duct connecting said fourth duct with said fifth duct, an adjustable damper in said sixth duct, and temperature responsive control means detecting the temperature in said heat exchange means and controlling the adjustment of the damper in said sixth duct.

References Cited in the file of this patent

UNITED STATES PATENTS

| | | |
|---|---|---|
| 509,450 | Rushforth | Nov. 28, 1893 |
| 2,078,747 | Vial | Apr. 27, 1937 |
| 2,292,243 | Schwartz | Aug. 4, 1942 |
| 2,417,345 | Beebe | Mar. 11, 1947 |
| 2,565,350 | Burns | Aug. 21, 1951 |
| 2,625,386 | Leone | Jan. 13, 1953 |

FOREIGN PATENTS

| | | |
|---|---|---|
| 892,727 | France | Jan. 13, 1944 |
| 1,035,611 | France | Apr. 22, 1953 |
| 1,112,863 | France | Mar. 20, 1956 |